United States Patent
Kaplan et al.

(10) Patent No.: US 10,152,602 B2
(45) Date of Patent: Dec. 11, 2018

(54) PROTECTING STATE INFORMATION FOR VIRTUAL MACHINES

(71) Applicant: Advanced Micro Devices, Inc., Sunnyvale, CA (US)

(72) Inventors: David Kaplan, Austin, TX (US); Leendert van Doorn, Austin, TX (US); Joshua Schiffman, Harrisburg, PA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 14/748,883

(22) Filed: Jun. 24, 2015

(65) Prior Publication Data
US 2016/0378522 A1    Dec. 29, 2016

(51) Int. Cl.
| | |
|---|---|
| *G06F 9/455* | (2018.01) |
| *G06F 21/60* | (2013.01) |
| *G06F 12/14* | (2006.01) |
| *G06F 12/1036* | (2016.01) |
| *G06F 21/53* | (2013.01) |

(52) U.S. Cl.
CPC ........ *G06F 21/602* (2013.01); *G06F 9/45558* (2013.01); *G06F 12/1036* (2013.01); *G06F 12/1408* (2013.01); *G06F 21/53* (2013.01); *G06F 2009/4557* (2013.01); *G06F 2009/45583* (2013.01); *G06F 2009/45587* (2013.01); *G06F 2212/402* (2013.01)

(58) Field of Classification Search
CPC ....... G06F 9/45558; G06F 2009/45587; G06F 2009/45579; G06F 21/602; G06F 21/62; G06F 2212/402
See application file for complete search history.

(56) References Cited

U.S. PATENT DOCUMENTS

| | | |
|---|---|---|
| 5,479,630 A | 12/1995 | Killian |
| 7,246,245 B2 | 7/2007 | Twomey |
| 8,151,262 B2 | 4/2012 | Challener et al. |
| 8,656,482 B1 | 2/2014 | Tosa et al. |
| 9,652,631 B2 | 5/2017 | Novak et al. |
| 9,680,805 B1 | 6/2017 | Rodgers et al. |
| 2003/0053630 A1 | 3/2003 | Elliott et al. |
| 2006/0005084 A1* | 1/2006 | Neiger ............... G06F 9/45533 714/47.1 |
| 2006/0010440 A1* | 1/2006 | Anderson ........... G06F 9/45533 718/1 |

(Continued)

OTHER PUBLICATIONS

International Search Report and Written Opinion correlating to PCT/US2015/017925 dated Dec. 11, 2015, 13 pages.

(Continued)

*Primary Examiner* — Charles M Swift
*Assistant Examiner* — Zhi Chen (57) ABSTRACT

A processing system includes a processor that implements registers to define a state of a virtual machine (VM) running on the processor. The processor detects exit conditions of the VM. The processing system also includes a memory element to store contents of the registers in a first data structure that is isolated from a hypervisor of the VM in response to the processor detecting an exit condition. The VM is to selectively expose contents of a subset of the registers to the hypervisor.

20 Claims, 8 Drawing Sheets

(56) References Cited

U.S. PATENT DOCUMENTS

| | | | |
|---|---|---|---|
| 2006/0021066 A1* | 1/2006 | Clayton | H04L 9/0822 726/28 |
| 2007/0223704 A1 | 9/2007 | Brickell et al. | |
| 2008/0126614 A1 | 5/2008 | Ooi | |
| 2008/0276235 A1 | 11/2008 | Knauerhase et al. | |
| 2009/0086979 A1 | 4/2009 | Brutch et al. | |
| 2009/0113110 A1 | 4/2009 | Chen et al. | |
| 2010/0115513 A1* | 5/2010 | Moriki | G06F 9/463 718/1 |
| 2010/0153749 A1 | 6/2010 | Sakai | |
| 2010/0175108 A1* | 7/2010 | Protas | G06F 21/53 726/3 |
| 2010/0281273 A1 | 11/2010 | Lee et al. | |
| 2011/0010707 A1 | 1/2011 | Serebrin et al. | |
| 2011/0246767 A1 | 10/2011 | Chaturvedi et al. | |
| 2011/0302400 A1 | 12/2011 | Maino | |
| 2012/0054740 A1 | 3/2012 | Chakraborty et al. | |
| 2013/0031374 A1 | 1/2013 | Thom et al. | |
| 2013/0097392 A1* | 4/2013 | Arges | G06F 9/468 711/152 |
| 2013/0111221 A1 | 5/2013 | Fujii et al. | |
| 2013/0198526 A1 | 8/2013 | Goto | |
| 2013/0227303 A1 | 8/2013 | Kadatch et al. | |
| 2013/0247035 A1 | 9/2013 | Khanna | |
| 2014/0281509 A1 | 9/2014 | Angelo et al. | |
| 2015/0215120 A1 | 7/2015 | Bursell | |
| 2015/0248357 A1 | 9/2015 | Kaplan et al. | |
| 2018/0060077 A1 | 3/2018 | Abdulhamid et al. | |

OTHER PUBLICATIONS

U.S. Appl. No. 14/494,643, filed Sep. 24, 2014, listing David Kaplan et al. as inventor(s), entitled "Cryptographic Protection of Information in a Processing System".

Final Office Action dated Jun. 24, 2016 for U.S. Appl. No. 14/494,643, 13 pages.

Non-Final Office Action dated Feb. 5, 2016 for U.S. Appl. No. 14/494,643, 22 pages.

International Search Report and Written Opinion correlating to PCT/US2016/051658 dated Dec. 13, 2016, 12 pages.

Final Office Action dated Feb. 1, 2017 for U.S. Appl. No. 14/494,643, 24 pages.

International Search Report and Written Opinion correlating to PCT/US2016/038694 dated Sep. 12, 2016, 10 pages.

Non-Final Office Action dated Oct. 3, 2016 for U.S. Appl. No. 14/494,643, 14 pages.

International Preliminary Report on Patentability correlating to PCT/US2015/017925, IPRP dated Sep. 6, 2016, 11 pages.

U.S. Appl. No. 15/081,126, filed Mar. 25, 2016, listing Jeremy W. Powell et al. as inventors, entitled "Key Management for Secure Memory Address Spaces".

Supplementary European Search Report dated Oct. 4, 2017 for EP Application No. 15 79 6570.8, 7 pages.

Non-Final Office Action dated Oct. 12, 2017 for U.S. Appl. No. 15/081,126, 15 pages.

Notice of Allowance Action dated Jun. 6, 2017 for U.S. Appl. No. 14/494,643, 26 pages.

Final Office Action dated Mar. 13, 2018 for U.S. Appl. No. 15/081,126, 54 pages.

Notification for Reasons for Refusal dated Apr. 17, 2018 for JP Application No. 2016-554448, 5 pages.

Office Action dated Aug. 6, 2018 for EP Application No. 15796570.8, 7 pages.

Office Action dated Jul. 31, 2018 for JP Application No. 2016-554448, 4 pages.

Wen, Yuanfeng et al. "Multi-processor architectural support for protecting virtual machine privacy in untrusted cloud environment," Proceedings of the ACM International Conference on Computing Frontiers, Jan. 1, 2013; 10 pages, XP 055232235; ISBN: 978-1-4503-2053-5.

* cited by examiner

PROTECTING STATE INFORMATION FOR VIRTUAL MACHINES

CROSS REFERENCE TO RELATED APPLICATIONS

This application is related to U.S. patent application Ser. No. 14/494,643, filed on Sep. 24, 2014, entitled "CRYPTOGRAPHIC PROTECTION OF INFORMATION IN A PROCESSING SYSTEM", which is incorporated herein in its entirety by reference.

BACKGROUND

Field of the Disclosure

The present disclosure relates generally to processing systems and, in particular, to information security in processing systems.

Description of the Related Art

The hardware of a single processor can be used to implement one or more virtual machines (VMs) that emulate separate and independent processors. For example, a processing unit, a memory, and other hardware in a processor together can be used to implement multiple VMs, with each VM functioning as a complete system platform that can execute a complete operating system when it is loaded into the processing unit. The processor implements a hypervisor to partition the hardware among the VMs, e.g., by allocating portions of the memory to the different VMs, loading a VM to run on a processing unit, or handling the VM exit process. The hypervisor isolates the different VMs to protect the security and integrity of the VMs. For example, a conventional hypervisor isolates different VMs from each other by defining separate memory page tables or other logical entities for each VM. However, data associated with the different VMs remains visible to the hypervisor and consequently the hypervisor can become a security vulnerability. Thus, a trust model that allows the VM data to be visible to the hypervisor without restriction is undesirable in certain environments, such as public cloud models where the VM owner does not or cannot trust the hypervisor and cloud environment. For example, an unscrupulous user may be able to identify flaws or bugs in the hypervisor that allow the user to modify and control operation of the hypervisor or other VMs on the processing system, which may expose private data stored for the other VMs.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The software that is used to implement a virtual machine (VM) in a processing system and the data generated by the VM (which may be collectively referred to as VM information) may be protected by employing a hardware encryption module in the memory access path of the processing system to cryptographically isolate secure VM information. The hardware encryption module encrypts data that is written to a memory by the VM or decrypts data that is read from the memory by the VM. Consequently, the data stored in the memory by the VM is not meaningfully accessible without the correct encryption/decryption key, which is not available to the hypervisor. However, without the additional security measures described herein the register values that define the state of the processor while running a VM remain visible to the hypervisor. The hypervisor may therefore remain vulnerable to exfiltration of state information or control flow attacks that modify the state information to cause unintended behavior. Simply hiding the register values from the hypervisor (e.g., by encrypting the register values) would greatly limit the functionality of the VM or render the VM inoperable because contents of some of the state registers must be available to the hypervisor to carry out some types of operations initiated by the VM.

The security of a VM is improved by isolating contents of state registers that define the state of the VM from a hypervisor and selectively exposing contents of one or more of the associated state registers to the hypervisor. In some embodiments, a hardware encryption module encrypts contents of the state registers as they are written to a data structure (referred to herein as a "virtual machine control block" or "VMCB") and to decrypt contents of the state registers as they are read from the data structure. The VM may then selectively expose contents of the state registers in another data structure (referred to herein as a "guest hypervisor communication block" or "GHCB") so that the decrypted values are visible to the hypervisor. For example, a VM may trigger an exit condition that results in a world switch. As used herein, the term "exit condition" indicates any event that causes the harbor to return control to the hypervisor. As used herein, the term "world switch" refers to removal of a VM or hypervisor from execution and initiation of execution of another VM or the hypervisor. Before the VM exits, the processor issues an exception to an exception handler implemented by the VM. The exception handler determines a portion of the state information that should be visible to the hypervisor and the VM exposes this portion to the GHCB. The VM then initiates the exit process and the contents of the state registers of the VM are encrypted and written back to the VMCB in response to the VM initiating the exit condition. The processor loads the hypervisor, which completes the exit process for the VM using the visible portion of the state information in the GHCB.

The hypervisor can initiate another world switch to load the VM into the processor. The contents of the state registers of the VM are decrypted by the processor hardware during the world switch and written to the state registers in the processor. The hypervisor may have modified contents of the state information stored in the GHCB while completing the exit process and so the contents of the state registers for the VM may be updated based on the modifications. For example, the hardware encryption module may decrypt the contents of the state registers stored in the VMCB and the exception handler may update the values based on information stored in the GHCB. In some embodiments, a checksum of the encrypted state information stored in the VMCB may be computed and used to validate the state information in the VMCB before returning the state information to the processor.

Figure 1:
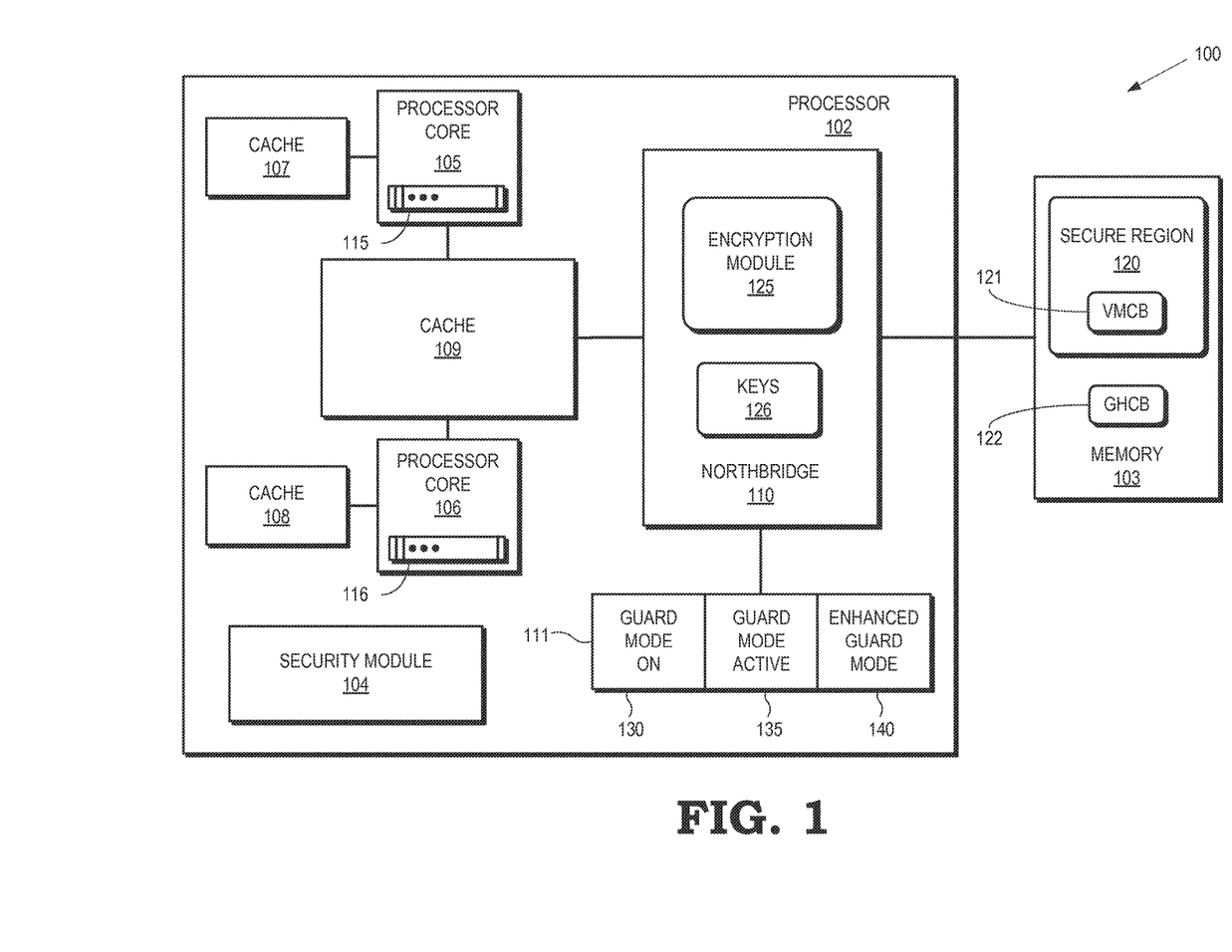
FIG. 1 illustrates a processing system that provides for isolation of state information associated with a VM according to some embodiments.

FIG. 1 illustrates a processing system 100 that provides for isolation of state information associated with a VM according to some embodiments. The processing system 100 includes a processor 102 and a memory 103. The processing system 100 can be incorporated in any of a variety of electronic devices, such as a server, personal computer, tablet, set top box, gaming system, and the like. The processor 102 operates to execute sets of instructions (e.g., computer programs) that manipulate the circuitry of the processor 102 to carry out defined tasks. The memory 103 facilitates the execution of these tasks by storing data used by the processor 102, and may further store the sets of instructions for access by the processor 102. The memory 103 can be random access memory (RAM), non-volatile memory such as flash memory or a hard disk drive (HDD), and the like, or a combination thereof.

In the course of executing the sets of instructions, the processor 102 generates memory access requests, including write requests to store data at the memory 103 and read requests to retrieve data from the memory 103. Each memory access request includes a memory address indicating a location at the memory 103 targeted by the memory access request. In response to a read request, the memory 103 retrieves information (data or instructions) stored at the location corresponding to the memory address of the read request and provides the information to the processor 102. In response to a write request, the memory 103 stores write information of the request at the location corresponding to the memory address of the write request.

The processor 102 includes a security module 104. Although the security module 104 is implemented in the processor 102 in the illustrated embodiment, some embodiments of the security module may reside outside of the processor 102 and be connected to the processor 102 via a bus. The security module 104 may be implemented as a general purpose processor core, a field programmable gate array (FPGA), an application specific integrated circuit (ASIC), a mode of operation of a processor core, or other module designed and configured to perform security operations for the processing system 100, including registration of entities (e.g. VMs, hypervisors, computer programs, and the like) to be executed at the processor 102, generation and identification of security keys for the entities to be executed, authentication of the processing system 100 for security operations, and the like. In some embodiments, the security module 104 may undergo a secure registration process before it is permitted to execute its operations, and may have its operations restricted to security operations only, so that it cannot execute operations that leave it vulnerable to exploitation. As described further herein, some embodiments of the security module 104 support the cryptographic isolation of information at the processing system 100 by generating the security keys, identifying the entities registered to be executed at the processing system 100, and other operations that enable such cryptographic isolation.

To facilitate execution of instructions, the processor 102 includes one or more processor cores, such as processor cores 105, 106, one or more caches, such as caches 107, 108, 109, a northbridge 110, and a security mode register 111. The processor cores 105, 106 are processing units that individually or concurrently execute instructions. In some embodiments, each of the processor cores 105, 106 includes an individual instruction pipeline that fetches instructions, decodes the fetched instructions into corresponding operations and, using the resources of the processing system 100, executes the operations, including memory access requests. Each of the processor cores 105, 106 is configured to identify each memory access request as one of two types: a secure memory access request, indicating that the information corresponding to the memory access request is designated for cryptographic protection, or a non-secure memory access request, indicating that the information corresponding to the memory access request is not designated for cryptographic protection.

The caches 107, 108, 109 are memory components that store subsets of the information stored at the memory 103, thereby providing the processor cores 105, 106 faster access to the respective information subset. It will be appreciated that although for clarity the cache 109 is illustrated as a single cache, in some embodiments the cache 109 can represent multiple caches, including different caches residing at different levels of a memory hierarchy of the processor 102. The cache 109 receives memory access requests and identifies whether its storage array (not shown at FIG. 1) stores information targeted by the memory access request. If so, the cache 109 indicates a cache hit and satisfies the memory access request at the storage array. If the cache 109 does not store the targeted information, it indicates a cache miss and provides the memory access request to a northbridge 110.

The northbridge 110 is a memory controller that provides an interface for the processor 102 to communicate with the memory 103. In some embodiments, the northbridge 110 can perform other functions, such as interfacing with an input/output controller (e.g. a southbridge, not shown), and providing an interface between different processor cores (e.g. the processor cores 105, 106 and other processor cores (not shown), such as a graphics processing unit. In its capacity as a memory controller, the northbridge 110 receives memory access requests from the cache 109 and controls provision of those requests to the memory 103. In addition, the northbridge 110 receives responses to memory access requests from the memory 103 and controls provision of the responses to the cache 109. In some embodiments, the northbridge 110 can receive memory access requests (e.g. direct memory access requests) from input/output devices (not shown) of the processing system 100 and controls their provision to the memory 103.

The processor cores 105, 106 each includes a corresponding set of one or more corresponding register that store values to define the state of the corresponding processor core. Register 115 represents this set of registers for processor core 105 and register 116 represents this set of registers for processor core 106. Some embodiments of the processor 102 are configured to execute multiple VMs (either concurrently or independently) under the control of a hypervisor. The hypervisor and each of the VMs are defined by a set of values corresponding to the registers 115, 116 that define the state of the processor cores 105, 106. The values in the registers 115, 116 therefore represent the state of a hypervisor or the states of one or more VMs when the processor 102 or the processor cores 105, 106 are executing the hypervisor or the one or more VMs. Values in the registers 115, 116 may be used to indicate instruction pointers for programs being executed by the hypervisor or the VMs, exit codes for the hypervisor or the VMs, floating-point data, floating-point tag or status information, floating-point control information, x87 register states, XMM register states, YMM register states, a bitmap including bits that indicate whether other registers include valid information, a location of a checksum previously computed based on values in the registers 115, 116, and the like.

The values stored in the registers 115, 116 may be moved between the memory 103 and the registers 115, 116 depending on the entity or entities that are currently executing on the processor 102. For example, a "world switch" may be used to exit or suspend execution of a first VM on the processor 102 and load a second VM (or the hypervisor) onto the processor 102 for execution. Values stored in the registers 115, 116 to define the state of the first VM are moved from the registers 115, 116 to the memory 103 and state register values that define the state of the second VM are moved from the memory 103 into the corresponding registers 115, 116. Depending on the state of the first VM or the second VM, values may be moved into or out of different subsets of the registers 115, 116, as discussed herein.

In at least one embodiment, the processing system 100 assumes a trust model in which each VM does not or cannot trust the hypervisor or any other VM. Information associated with the different VMs may therefore be isolated from each other and the hypervisor by storing the information in a secure region 120 of the memory 103 so that the information is inaccessible to the hypervisor and the other VMs. The isolated information may include information written to the memory 103 or read from the memory 103 during execution of instructions associated with a VM. The isolated information also includes contents of the registers that represent the states of the VMs. The contents of the registers for each VM may therefore be stored in a data structure 121, which is referred to herein as a virtual machine control block (VMCB) 121. For example, if an exit condition is detected for a VM running on the processor 102, values in the registers 115, 116 are stored in the VMCB 121 so that the values are isolated from the hypervisor and other VMs. A subset of contents of the registers 115, 116 may be needed by the hypervisor, e.g., to complete the VM exit process that was initiated in response to detecting the exit condition. The VM may therefore selectively expose contents of the subset of the registers to the hypervisor (or other VMs) by storing the values in another data structure 122, which is referred to herein as a guest hypervisor communication block (GHCB) 122.

In some embodiments, information may be isolated from the hypervisor and other VMs by storing the information at memory locations that are physically inaccessible to the hypervisor or the other VMs. Information associated with a VM may also be isolated from the hypervisor and other VMs by encrypting the data that is stored in the data structure 121 using one or more security keys that are unknown to the hypervisor or the other VMs. For example, the contents of the registers 115, 116 may be encrypted using a hardware encryption module prior to storing the contents of the registers in the data structure 121, thereby rendering the information stored in the data structure 121 inaccessible to the hypervisor or the other VMs. Encryption or concealment of the location of the data structure 121 may be used together or separately to isolate the information from the hypervisor and other VMs.

To provide for cryptographic isolation of information, the northbridge 110 includes a hardware-implemented encryption module 125 that operates to encrypt and decrypt information according to a specified cryptographic standard, and based on keys 126. In some embodiments, the encryption module 125 employs Advanced Encryption Standard (AES) encryption and decryption, but in other embodiments the encryption module 125 may employ other encryption/decryption techniques. Some embodiments of the encryption module 125 may be implemented using hardcoded logic (e.g., as a fixed, predetermined set of wires, traces, transistors, and other elements), programmable logic such as an FPGA, or a combination of hardcoded and programmable logic.

In response to receiving a write request, the northbridge 110 identifies whether the request is a secure memory access request or a non-secure memory access request. If the write request is a non-secure memory access request, the northbridge 110 bypasses the encryption module 125 and provides the write request to the memory 103 without encrypting the information to be written. If the write request is a secure memory access request, the northbridge 110 identifies one of the keys 126 that is assigned to the entity (e.g. program, VM, software service, and the like) that generated the memory access request. The encryption module 125 employs the selected key to encrypt the information to be written and provides the write request, with the encrypted information, to the memory 103 for storage. In some embodiments, the encryption module 125 uses both the selected key and the physical address of the memory access request for encryption and decryption of the corresponding information thereby preventing block move attacks. In some embodiments, the encryption module 125 identifies whether to use the physical address for encryption and decryption based on the state of a control bit (not shown) at the processor 102. The control bit state can be set by the security module 104.

In response to receiving a read request, the northbridge 110 provides the request to the memory 103 and subsequently receives the information responsive to the request. If the northbridge 110 identifies the read request as a non-secure memory access request it bypasses the encryption module 125 and provides the read information to the cache 108 without encryption. If the northbridge 110 identifies the read request as a secure memory access request, it identifies one of the keys 126 that is assigned to the entity that generated the read access request and the encryption module 125 decrypts the read information. The northbridge 110 provides the decrypted read information to the cache 108 for storage. In some circumstances, the northbridge 110 may bypass provision of information to the cache 108 and provides the decrypted read information directly to the processor core that generated the corresponding read access request.

The encryption module 125 is also used to encrypt and decrypt values stored in the registers 115, 116. In response to detecting an exit condition for a VM executing in the processor 102, the northbridge 110 identifies one of the keys 126 that is assigned to the VM. The encryption module 125 employs the selected key to encrypt the value stored in the registers 115, 116 and then provides the encrypted values to the memory 103 for storage in the data structure 121. In response to detecting a request to load a VM on to the processor 102 for execution, the northbridge 110 identifies one of the keys 126 that is assigned to the VM. The northbridge 110 provides a request for the encrypted state information stored in the data structure 121 and receive the encrypted state information in response to providing the request. The encryption module 125 employs the selected key to decrypt the encrypted state information and then the northbridge 110 uses the decrypted state information to populate the corresponding registers 115, 116 so that the state of the processor cores 105, 106 represents the state of the VM.

Values in the registers 115, 116 may be exposed (e.g., to the hypervisor or other VMs) by storing unencrypted values in the data structure 122. For example, the processor 102 may issue an exception in response to detecting an exit condition for a VM executing on the processor 102. The exception may be issued based on the type of exit condition. For example, the exception may not be issued for automatic exits and may be issued for non-automatic exits. An automatic exit is an exit condition that does not require that the VM be made aware of the exit and the VM does not instantiate a VM exception handler. Automatic exits may include events that are not expected to modify state information that defines the VM on the processor. Non-automatic exits are exit conditions that require notifying the VM that an exit condition has occurred. An exception handler in the VM may detect the exception and, in response, determine a subset of the values in the registers 115, 116 that is to be exposed. For example, the subset of the values may correspond to state information that is needed by the hypervisor to complete an exit process for the VM. The northbridge 110 may therefore provide unencrypted values corresponding to the subset of the values in the registers 115, 116 to the data structure 122, thereby making the subset of the values accessible to the hypervisor or other VMs.

In some embodiments, the security mode register 111 is employed to control operation of the encryption module 125. The security mode register 111 includes a guard-mode-on field 130, a guard-mode-active field 135, and an enhanced guard mode field 140 for each VM that may be executed on the processor 102. In some embodiments, different security mode registers 111 may be implemented in the processor cores 105, 106. In response to the guard-mode-on field 130 being in a specified state (e.g., a negated state) for an associated VM, the northbridge 110 bypasses the encryption module 125 for all memory access requests by the associated VM, including secure memory access requests or memory access requests to the data structure 121. This allows the processing system 100 to operate in a mode where encryption and decryption are bypassed for all programs being executed at the processor 102. In response to the guard-mode-on field 130 being in a different specified state (e.g. an asserted state), the northbridge 110 identifies a state of the guard-mode-active field 135. In response to the guard-mode-active field 135 being in a specified state (e.g. a negated state) the northbridge 110 bypasses the encryption module 125 for received memory access requests associated with the VM (including secure memory access requests or memory access requests to the data structure 121) and, in response to the guard-mode-active field 135 being in a different state (e.g., an asserted state) bypasses the encryption module 125 only for non-secure memory access requests. The enhanced guard mode field 140 may be used to control whether exceptions are issued in response to particular types of exit conditions such as non-automatic exits.

Figure 2:
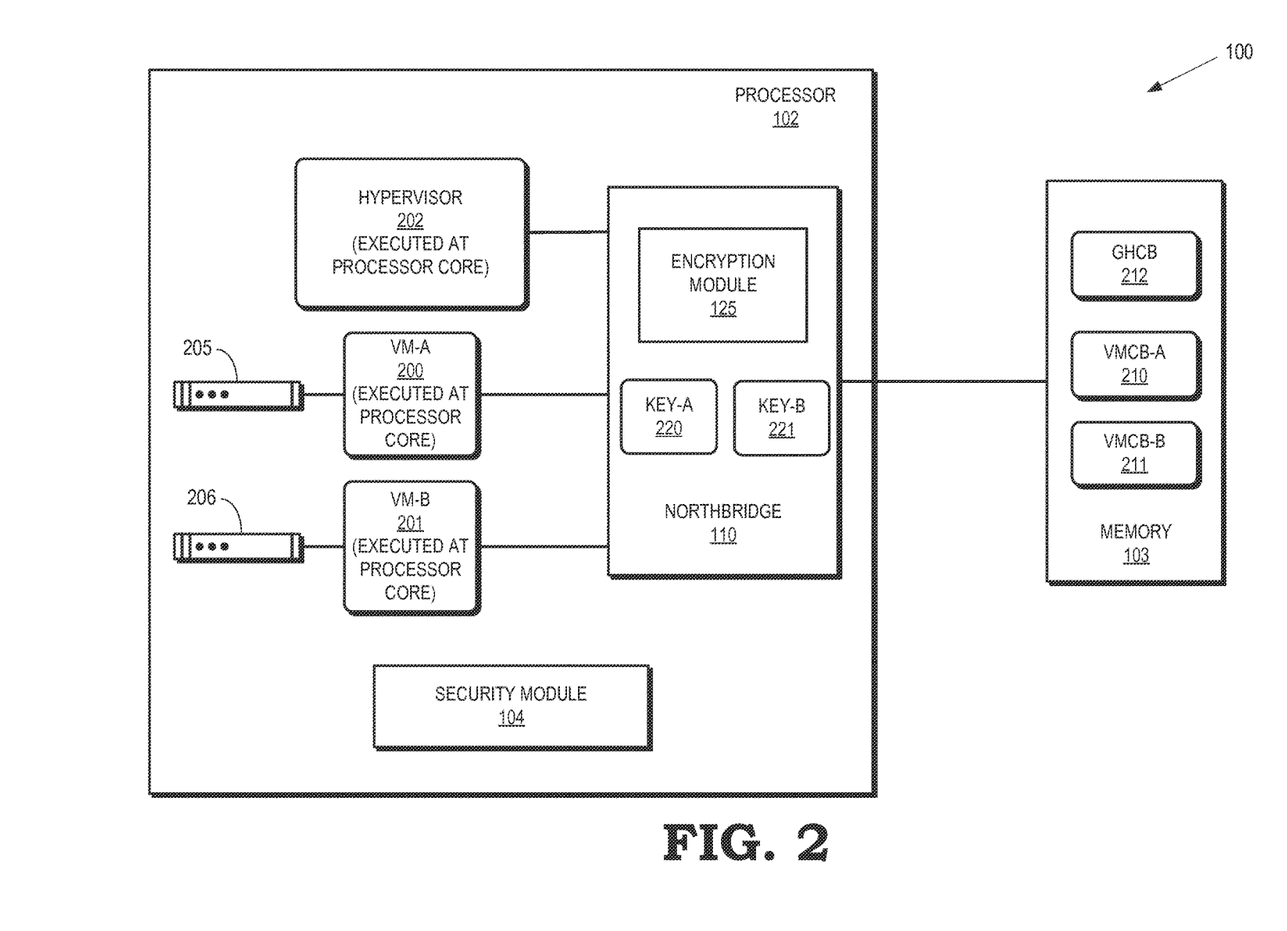
FIG. 2 illustrates an example operation of the processing system to provide for cryptographic isolation of information for VMs according to some embodiments.

FIG. 2 illustrates an example operation of the processing system 100 to provide for cryptographic isolation of information for VMs according to some embodiments. In the depicted example, the processor 102 is to concurrently execute a VM 200 and a VM 201. In addition, the processor 102 executes a hypervisor 202 to provide an interface between the VMs 200, 201 and the hardware of the processing system 100. In the course of their execution, the VMs 200, 201 are to access (store and retrieve) secure information from the memory 103, as discussed herein. Exit conditions at the VMs 200, 201 result in state information in the corresponding registers 205, 206 being stored in corresponding secure memory locations such as the data structures 210, 211, which may correspond to the data structures 121, 122 shown in FIG. 1. The encryption module 125 ensures that the state information for the VMs 200, 201 stored in the data structures 210, 211 are cryptographically isolated, so that they can only be accessed by their respective VM. Encrypted information stored in the data structures 210, 211 are isolated from and inaccessible to other VMs or the hypervisor 202. State information in the registers 205, 206 may be selectively exposed by storing unencrypted information in the data structure 212. In some embodiments, different data structures 212 may be associated with different VMs.

In operation, prior to being permitted to execute at the processor 102, each of the VMs 200. 201 register with the security module 104. In some embodiments, a VM is registered as follows: the VM owner establishes a secure communication channel (not shown at FIG. 2) with the security module 104, e.g., using a secure handshaking protocol. An identification value, designated a "VMID" and a security key, designated a "VMKEY", are generated for the VM. This generation can be done at the security module 104 or at a separate security device and communicated to the security module 104 via the secure communication channel. The security module 104 ensures that each of the VMKEY and VMID values are unique to the corresponding VM. The VM owner encrypts (or asks the security module 140 to encrypt) an image of the corresponding VM and provides it to the hypervisor 202, which stores the encrypted image as secure data at the memory 103.

Subsequently, the processor 102 receives a request to execute a VM. In response to the request, the processor 102 notifies the security module 104 of the VMID for the requested VM. The security module 104 identifies, based on the VMID, the security key for the requested VM from the security keys 126 and provides the security key to the encryption module 125. In the illustrated example of FIG. 2, the processor 102 has received requests to execute both VMs 200, 201, which may be referred to hereinafter as VM-A 200 and VM-B 201. The security module 104 provides a key 220 for VM-A 200, and a key 221 for VM-B 201, to the encryption module 125. The northbridge 110 requests state information for the VMs 200, 201 from the corresponding data structures 210, 211 and then decrypts the received information using the corresponding keys 220, 221. The decrypted state information is stored in the corresponding registers 205, 206 to define the states of the VMs 200, 201.

In the course of their execution, the VMs 200, 201 generate memory access requests and provide them to the northbridge 110, which identifies, based on one or more bits included with the memory address of the request, whether the memory access request is a secure memory access request. If not, the northbridge 110 bypasses the encryption module 125 and satisfies the memory access request without encryption or decryption. If the memory access request is a secure memory access request, the northbridge 110 identifies, based on the memory address or other information provided with the memory access request, which of the VMs 200, 201 generated the memory access request. The encryption module 125 selects the one of the keys 220, 221 corresponding to the VM that generated the memory access request and performs encryption (in the case of a write request) or decryption (in the case of a read request) on the memory access information (the read data or the write data) using the selected key. The encryption module 125 may also perform decryption on a write request and encryption of a read request.

One or more of the VMs 200, 201 may generate an exit condition to initiate the process of terminating execution of the corresponding VM at the processor. This process may be referred to as an exit process of the VM. In response to detecting the exit condition, the northbridge 110 accesses of the state information stored in one or more corresponding registers 205, 206 and provides the state information to the encryption module 125 for encryption based on one or more corresponding keys 220, 221. The northbridge 110 then writes the encrypted information to one or more corresponding data structures 210, 211 in the memory 103. The processor 102 determines whether the exit condition is an automatic exit or a non-automatic exit and, if the exit condition is a non-automatic exit, the processor 102 issues an exception in response to detecting the exit condition. An exception handler responds to the exception by determining whether values in one or more of the registers 205, 206 are to be exposed to the hypervisor 202 or other VMs 200, 201. If so, the northbridge 110 bypasses the encryption module 125 and writes unencrypted contents of a subset of the registers 205, 206 to the data structure 212 in the memory 103.

As described above, the cryptographic protection of data takes place at the northbridge 110 and the keys used for cryptographic protection are unknown and inaccessible to the VMs 200, 201 and the hypervisor 202. This ensures that one VM cannot access the secure information for the other VM. For example, upon exit, the state information that defines the VM 200 is stored in the data structure 210. Because the state information is associated with the VM 200, the encryption module 125 encrypts the state information using the key 220, assigned to VM 200, rather than with key 221 that is assigned to the VM 201. Accordingly, neither the hypervisor 202 nor the VM 201 will be able to meaningfully or correctly interpret or decrypt the encrypted state information, as neither the hypervisor 202 nor the VM 201 has access to the correct key. The state information stored in the data structure 210 is thus cryptographically isolated from access by the VM 201 and the hypervisor 202.

In some embodiments, the processing system 100 periodically changes the keys 220, 221 to enhance security. For example, the security module 104 can generate a new key for a VM whenever the VM is fully shut down (not paused) to ensure the VM has the new key when it is restarted. For the VMs secure information stored at the memory 103 under the old key, the security module 104 can instruct the northbridge 110 to decrypt such information using the old key and re-encrypt the information using the new key, so that the secure information is accessible when the VM is restarted.

The security module 104 can generate a new key for a VM in response to the VM entering a pause state. A portion of the VM (e.g. a guest operating system) maintains a data structure that identifies memory pages of the memory 103 that store encrypted data for the VM. In response to the VM entering the pause state, the security module 104 instructs the northbridge 110 to decrypt the identified memory pages using the old key, and re-encrypt the memory pages using the new key, thereby ensuring that the VM can access its secure information when it exits the pause state.

Figure 3:
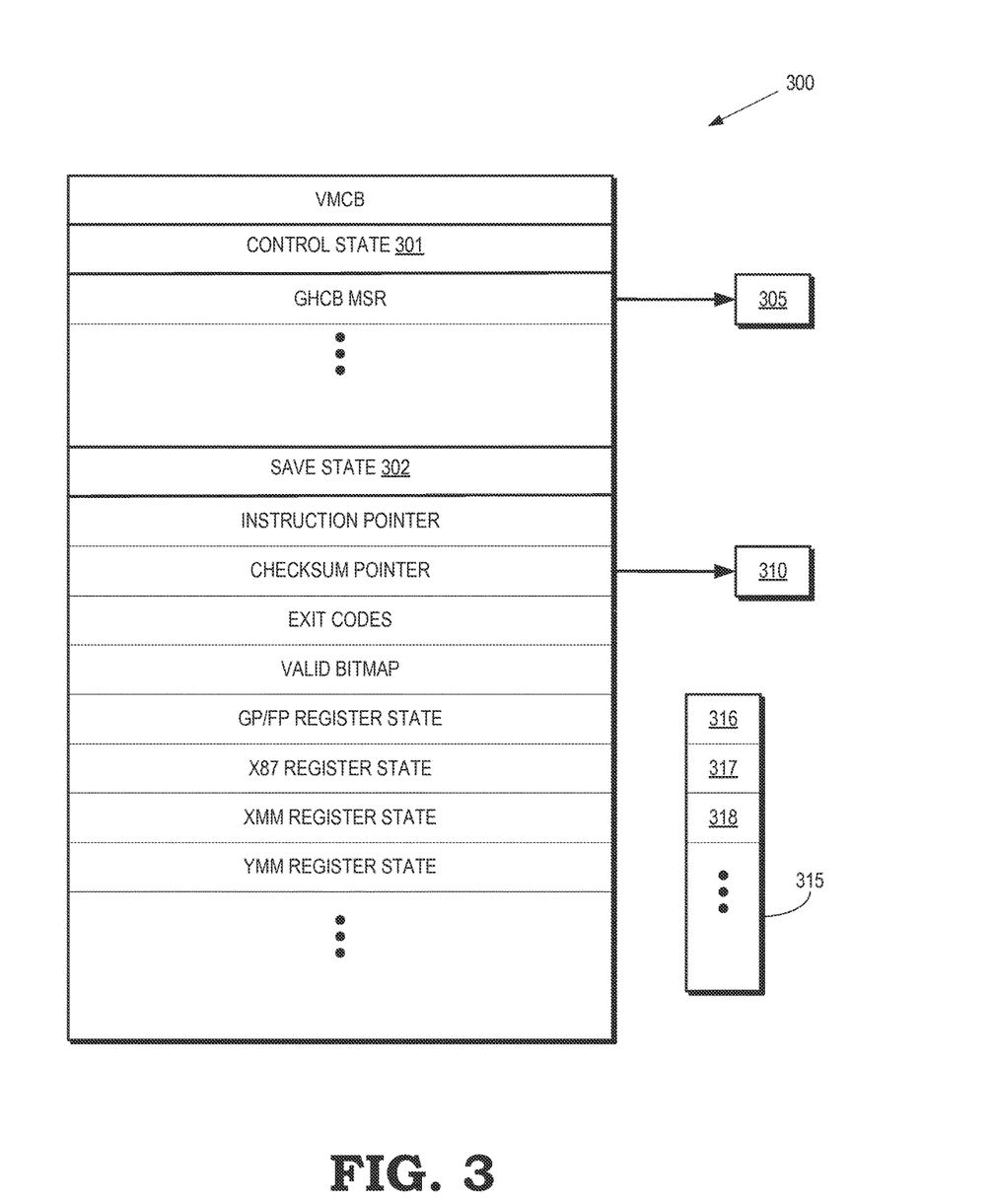
FIG. 3 is a block diagram of a virtual machine communication block (VMCB) according to some embodiments.

FIG. 3 is a block diagram of a data structure 300, which is one example implementation of a virtual machine communication block (VMCB) according to some embodiments. The data structure 300 may be used to implement some embodiments of the data structure 121 shown in FIG. 1 or the data structures 210, 211 shown in FIG. 2. The data structure 300 includes a field to store control state information 301 and a field to store save state information 302 for a VM that may be executed on a processor such as the processor 102 shown in FIG. 1. The information in the data structure 300 may therefore be stored in the data structure 300 from one or more registers such as the registers 115, 116 shown in FIG. 1 and may be written from the data structure 300 to the one or more registers.

Some embodiments of the control state information 301 are left unencrypted in the data structure 300 so that they are accessible to a hypervisor associated with the VM, as well as other VMs. Control state information 301 may include contains information that indicates events that are signaled to the hypervisor, information indicating whether interrupts are pending for the guest, and the like. The hypervisor uses the control state information 301 to perform operations such as loading the VM into the processor and performing the exit process to terminate execution of the VM on the processor. For example, the control state information 301 includes a value of a machine specific register (MSR) that indicates the location of a second data structure 305 (such as a GHCB) that is used to expose a subset of the save state information 302 to the hypervisor, as discussed herein. Some embodiments of the VM can read or write the value of the MSR that indicates the location of the second data structure 305.

The save state information 302 comprises encrypted contents of registers that define the state of the VM when executing on the processor. The save state information 302 includes an instruction pointer that indicates a location of the instruction that is to be executed by the VM or the location of the instruction that was most recently executed by the VM. Some embodiments of the save state information 302 include exit codes for the hypervisor or the VM, a bitmap including bits that indicate whether other registers include valid information, general-purpose register state information, floating-point register state information including floating-point tag or status information or floating-point control information, x87 register state information, XMM register state information, and YMM register information. Some embodiments of the save state information 302 may also include a pointer to a location of a checksum 310 previously computed based on values stored in the registers prior to moving the information from the registers to the data structure 300. For example, the checksum 310 may be stored in a memory location in the memory 103 shown in FIG. 1. The value of the checksum 310 is used to confirm that the information written back into the registers is the same as the information that was previously saved from the registers.

In some embodiments, the state of the VM may be defined by a subset of the contents of the registers in the save state information 302. Thus, only a subset of the save state information 302 may be encrypted and stored in the data structure 201 when the VM exits the processor. The same subset may be decrypted and written to the registers in the processor when execution of the VM is initiated on the processor. The subset of the save state information 302 is indicated by a corresponding array 315 of bits 316, 317, 318. For example, the bit 316 may be set to a value of "1" to indicate that the floating-point register state is used to define the state of the VM, the bit 317 may be set to a value of "1" to indicate that the x87 register state is used to define the state of the VM, and the bit 318 may be set to a value of "0" to indicate that the XMM register state is not used to define the state of the VM. The array 315 may be implemented as a machine specific register (MSR).

Figure 4:
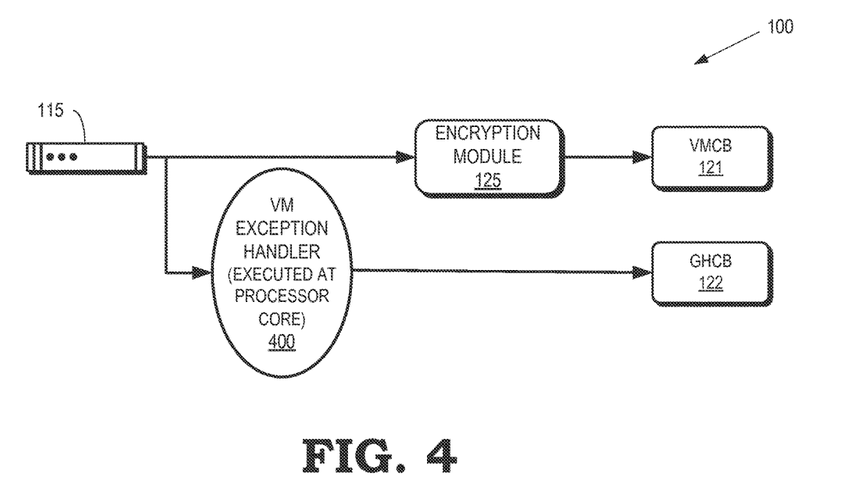
FIG. 4 illustrates an example operation of the processing system to provide for cryptographic isolation of information for a VM and to selectively expose a portion of the state information according to some embodiments.

FIG. 4 illustrates an example operation of the processing system 100 to provide for cryptographic isolation of information for a VM and to selectively expose a portion of the information according to some embodiments. Initially, the VM is executing on the processing system 100. The processing system 100 detects an exit condition indicating that that the VM is to terminate execution on the processing system. In response to detecting the exit condition, the encryption module 125 encrypts contents of the registers 115 and stores the encrypted values in the first data structure 121. The processing system 100 may also determine whether the exit condition indicates an automatic exit or a non-automatic exit. If the exit condition is a non-automatic exit, the processing system 100 issues an exception that may be handled by a VM exception handler 400. The VM exception handler 400 determines a subset of the contents of the registers 115 that are to be exposed, e.g., to a hypervisor. For example, the VM exception handler 400 can expose contents of a subset of the registers 115 that are to be used by the hypervisor to complete the exit process for the VM. The VM exception handler 400 then copies the subset of values to the second data structure 122. The VM exception handler 400 bypasses the encryption module 125 so that the copies of the subset of values stored in the second data structure 122 are unencrypted and therefore exposed to other entities.

Figure 5:
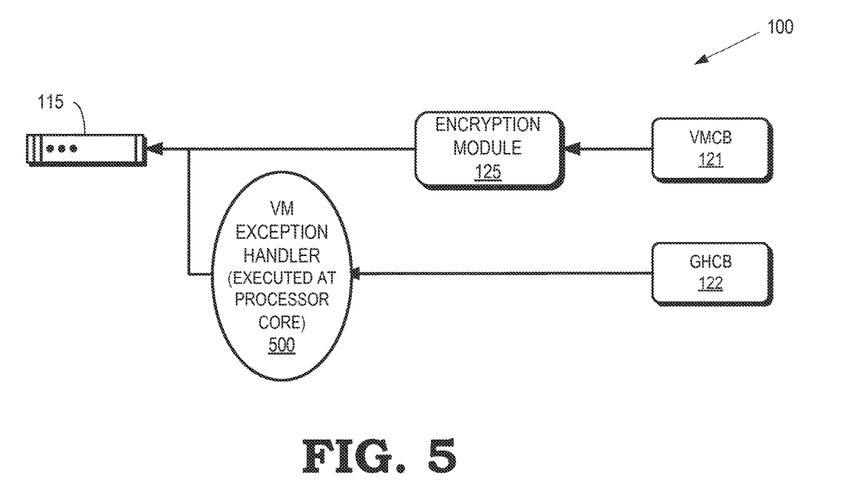
FIG. 5 illustrates an example operation of the processing system to decrypt information for a VM according to some embodiments.

FIG. 5 illustrates an example operation of the processing system 100 to decrypt information for a VM according to some embodiments. The processing system 100 receives a command to initiate execution of the VM on a processor such as the processor 102 shown in FIG. 1. In response to receiving the command, the encryption module 125 transmits a request for information stored in the first data structure 121, receives the requested encrypted information, and then decrypts the encrypted information received from the first data structure 121. The decrypted information is stored in corresponding registers 115. An entity such as a hypervisor may have modified information stored in the second data structure 122 prior to the processing system 100 receiving the command and consequently a subset of the contents of the registers 115 may need to be modified to reflect the changes made by the hypervisor. For example, the hypervisor may modify contents of information stored in the second data structure 122 are completing a previous exit process for the VM, which may therefore be unaware of the changes made to the values in the second data structure 122. In the case of a non-automatic exit, a VM exception handler 500 transmits a request for the information stored in the second data structure 122, receives the requested information, and determines whether any of the information has been modified. If so, the VM exception handler 500 may modify the corresponding values in the registers 115.

Figure 6:
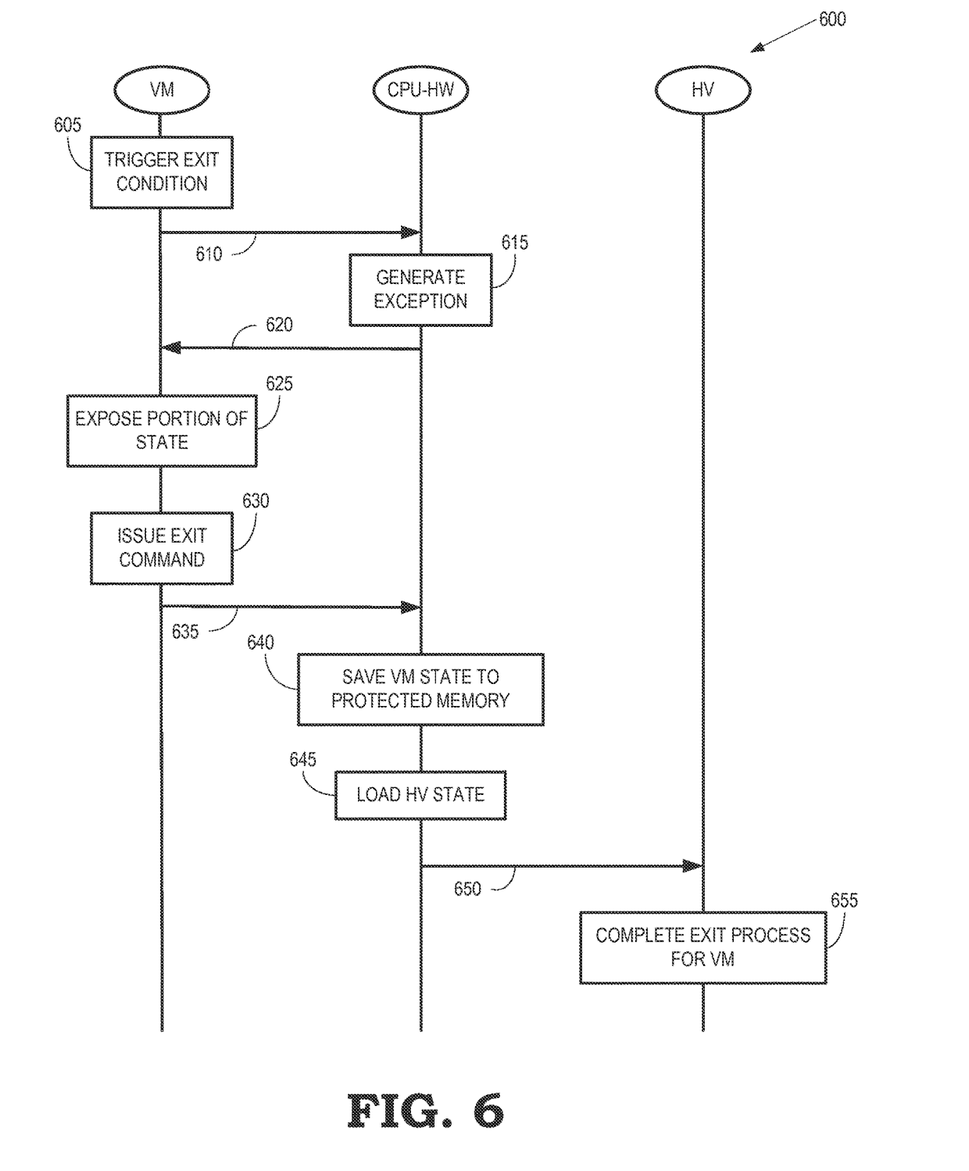
FIG. 6 is a diagram for a method for terminating execution of a VM on a processor according to some embodiments.

FIG. 6 is a diagram for a method 600 for terminating execution of a VM on a processor in response to a non-automatic exit condition according to some embodiments. The method 600, which also is referred to herein as a non-automatic exit process, is implemented in a VM such as the VMs 200, 201 shown in FIG. 2, processor (CPU-HW) such as the processor 102 shown in FIG. 1, and a hypervisor such as the hypervisor 202 shown in FIG. 2.

At block 605, the VM triggers an exit condition that initiates a non-automatic exit process for terminating execution of the VM on the processor. In response to the exit condition, the VM generates signaling 610 that is detected by the processor, which generates an exception (at block 615) in response to detecting the exit condition. Some embodiments of the exception are enabled based on information stored in a security mode register such as the security mode register 111 shown in FIG. 1. For example, the exception may be enabled based on values stored in the enhanced guard mode field 140 shown in FIG. 1. The exception may have an error code that corresponds to an error code for the exit condition triggered by the VM. Exception signaling 620 then may be provided to the VM.

As discussed herein, some embodiments of the VM instantiate a VM exception handler to detect and handle exceptions such as the exception 620 generated by the processor. In response to detecting the exception 620, the VM exception handler determines whether a portion of the state information that defines the VM is to be exposed, e.g., to the hypervisor, prior to completing the exit process. At block 625, the VM exception handler exposes the portion of the state information, which may include contents of a subset of registers in the processor such as the registers 115, 116 shown in FIG. 1 or the registers 205, 206 shown in FIG. 2. Exposing the portion of the state information includes writing unencrypted contents of the state information to a data structure that is accessible to the hypervisor. In some embodiments, exposing the state information includes copying an error code associated with the state information to the data structure. At block 630, the VM exception handler generates an exit command and exit command signaling 635 is provided to the processor.

In response to the exit command signaling 635, the processor saves the state information to a protected memory location at block 640. Some embodiments of the processor implement an encryption module such as the encryption module 125 shown in FIG. 1 to encrypt the state information prior to storing the encrypted state information in a data structure such as the data structure 121 shown in FIG. 1 or the data structures 210, 211 shown in FIG. 2. The encryption module encrypts the state information using one or more security keys that are known to the encryption module and the VM, but are unknown to other entities including the hypervisor. Some embodiments of the processor may save contents of a subset of the registers indicated by bits such as the bits 316-318 in the array 315 shown in FIG. 3.

At block 645, the processor loads hypervisor state information into the registers after the state information has been saved in the protected memory. Signaling 650 may then be provided by the processor to initiate execution of the hypervisor on the processor based on the hypervisor state information stored in the processor registers. At block 655, the hypervisor completes the exit process for the VM based on the exposed portion of the state information. Completing the exit process may include modifying contents of the exposed portion of the state information. For example, the hypervisor may modify the values using returned values from emulated input/output devices.

Figure 7:
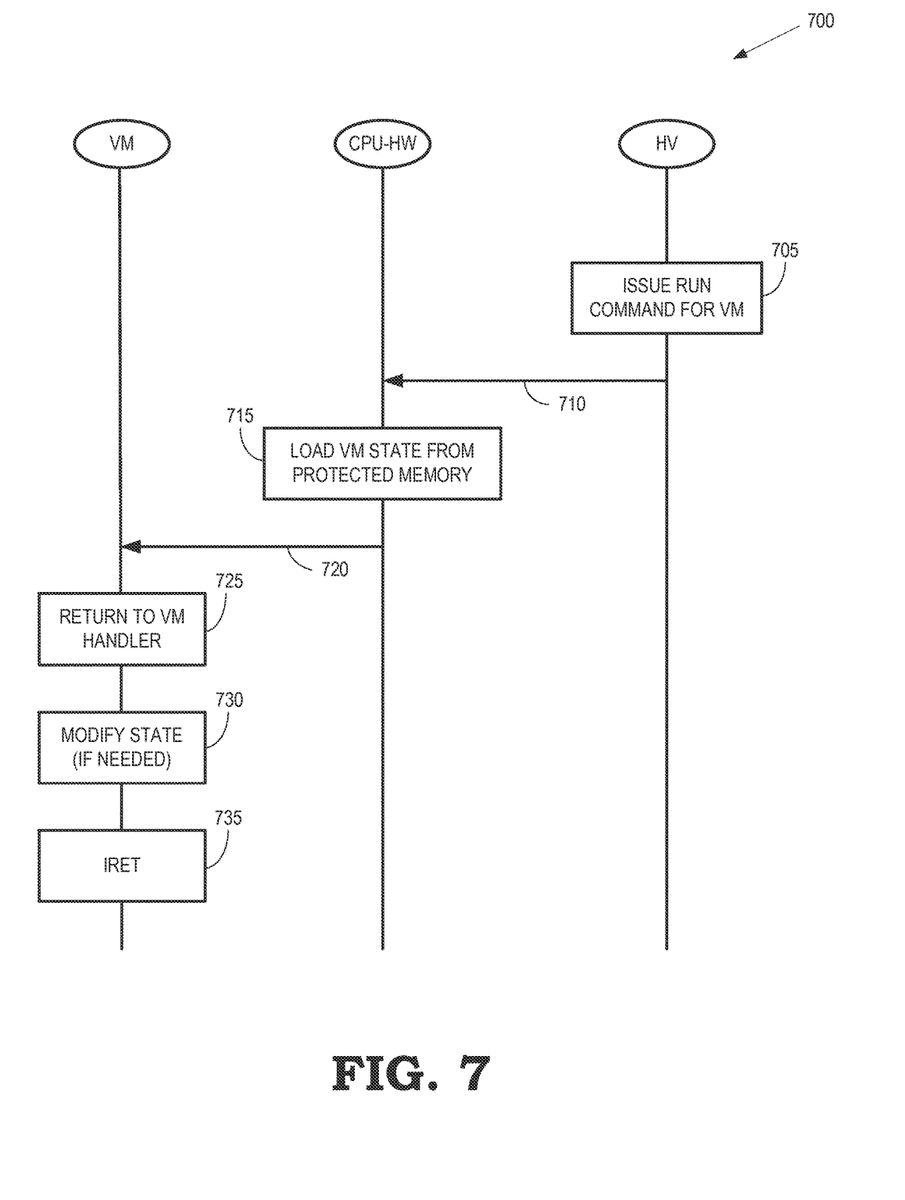
FIG. 7 is a diagram for a method for initiating execution of a VM on a processor according to some embodiments.

FIG. 7 is a diagram for a method 700 for initiating execution of a VM on a processor following a non-automatic exit process according to some embodiments. The method 700, which also is referred to herein as an run process, is implemented in a VM such as the VMs 200, 201 shown in FIG. 2, processor (CPU-HW) such as the processor 102 shown in FIG. 1, and a hypervisor such as the hypervisor 202 shown in FIG. 2.

At block 705, the hypervisor issues a run command for the VM and transmits signaling 710 to the processor to initiate the process of loading the VM onto the processor for execution. At block 715, the processor loads state information from the protected memory. For example, an execution module in the processor can request encrypted state information from the protected memory, receive the encrypted state information, and decrypt the encrypted state information. Some embodiments of the processor may validate the encrypted state information based on a previously computed checksum prior to decrypting and saving the state information to the registers in the processor. For example, the processor may validate the encrypted state information using a checksum such as the checksum 310 shown in FIG. 3. The decrypted state information may then be loaded into registers in the processor. Signaling 720 indicates that the state information has been loaded into the registers of the processor.

In response to the signaling 720, control is returned to the VM exception handler at block 725. The VM exception handler determines whether any of the exposed state information has been modified, e.g., by the hypervisor as part of the exit process shown in FIG. 6. At block 730, the VM exception handler modifies values in the registers corresponding to exposed state information that was modified, if any is detected. At block 735, the VM exception handler returns control to the VM, which may then be executed based on the state information stored in the registers of the processor.

Figure 8:
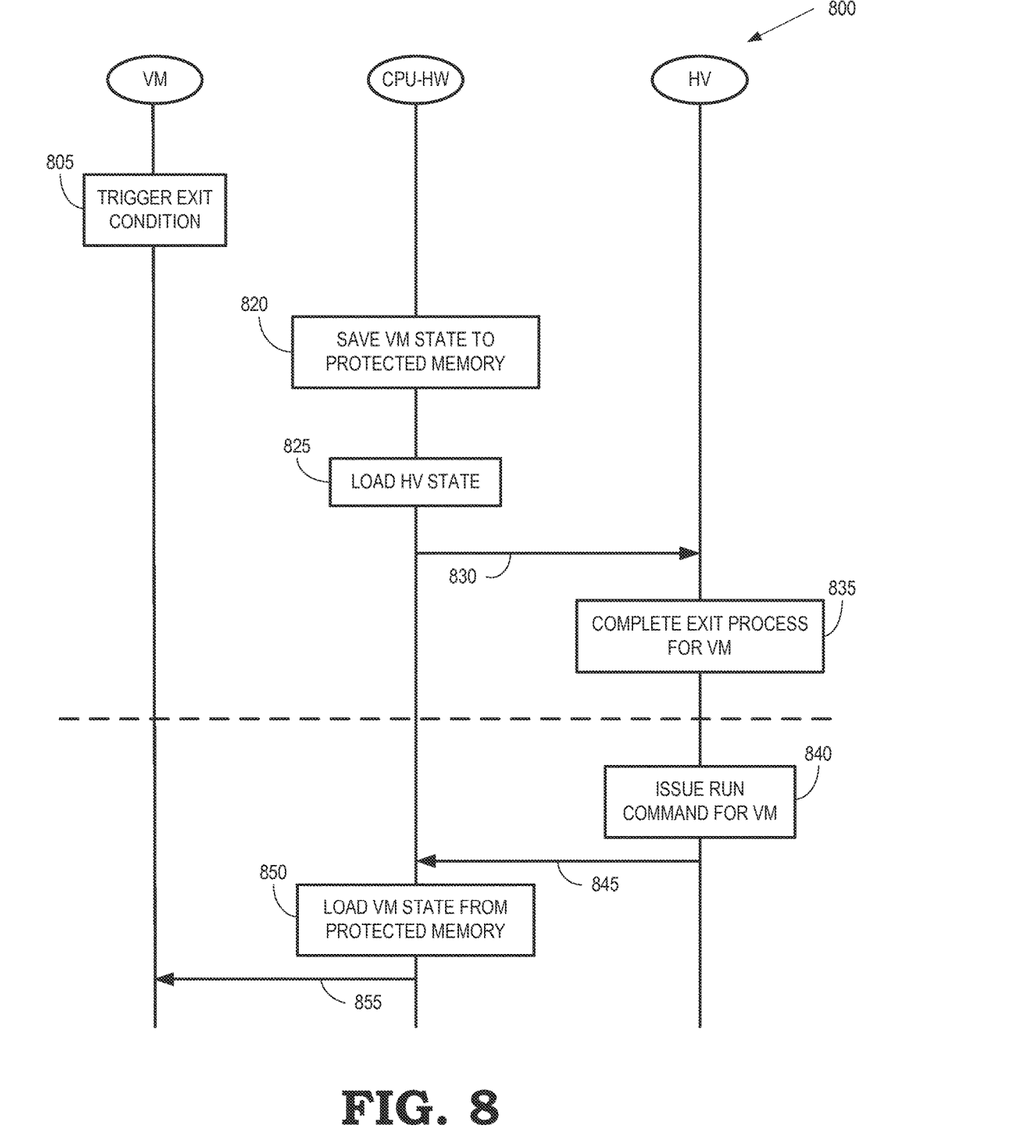
FIG. 8 is a diagram for a method for terminating execution of a VM on a processor in response to an automatic exit condition according to some embodiments.

FIG. 8 is a diagram for a method 800 for terminating execution of a VM on a processor in response to an automatic exit condition according to some embodiments. The method 800, which also is referred to herein as an automatic exit process, is implemented in a VM such as the VMs 200, 201 shown in FIG. 2, processor (CPU-HW) such as the processor 102 shown in FIG. 1, and a hypervisor such as the hypervisor 202 shown in FIG. 2.

At block 805, the VM triggers an exit condition that initiates an automatic exit process for terminating execution of the VM on the processor. In response to the exit condition trigger, the processor saves the state information to a protected memory location at block 820. Some embodiments of the processor implement an encryption module such as the encryption module 125 shown in FIG. 1 to encrypt the state information prior to storing the encrypted state information in a data structure such as the data structure 121 shown in FIG. 1 or the data structures 210, 211 shown in FIG. 2. The encryption module encrypts the state information using one or more security keys that are known to the encryption module and the VM, but are unknown to other entities including the hypervisor. Some embodiments of the processor may save contents of a subset of the registers indicated by bits such as the bits 316-318 in the array 315 shown in FIG. 3.

At block 825, the processor loads hypervisor state information into the registers after the state information has been saved in the protected memory. Signaling 830 may then be provided by the processor to initiate execution of the hypervisor on the processor based on the hypervisor state information stored in the processor registers. At block 835, the hypervisor completes the exit process for the VM.

Execution of the VM may be initiated on the processor following the automatic exit process. At block 840, the hypervisor issues a run command for the VM and transmits signaling 845 to the processor to initiate the process of loading the VM onto the processor for execution. At block 850, the processor loads state information from the protected memory. For example, an execution module in the processor can request encrypted state information from the protected memory, receive the encrypted state information, and decrypt the encrypted state information. Some embodiments of the processor may validate the encrypted state information based on a previously computed checksum prior to decrypting and saving the state information to the registers in the processor. For example, the processor may validate the encrypted state information using a checksum such as the checksum 310 shown in FIG. 3. The decrypted state information may then be loaded into registers in the processor. Signaling 855 indicates that the state information has been loaded into the registers of the processor and the VM may begin execution.

Figure 9:
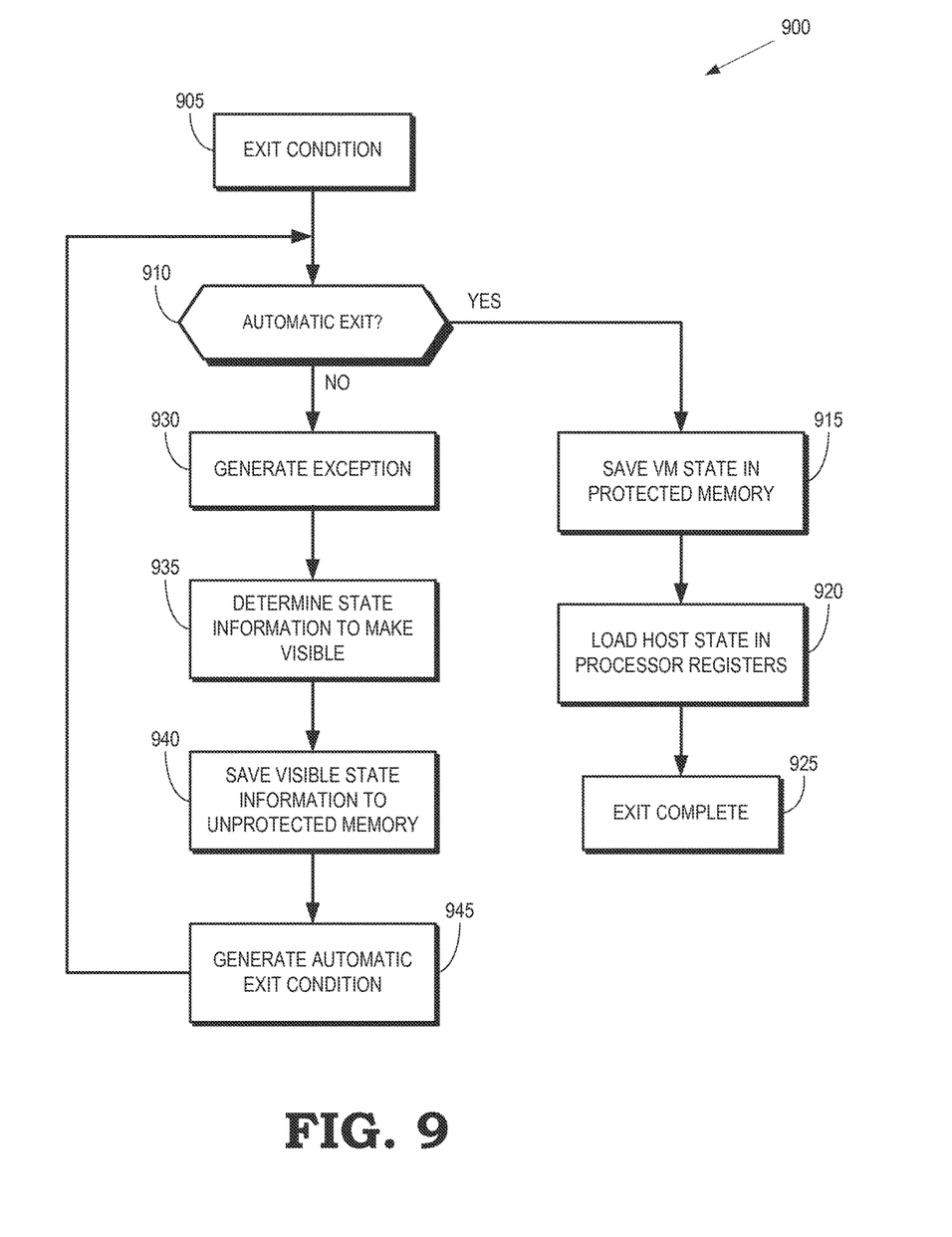
FIG. 9 is a flow diagram of a method for handling an exit process for a VM based on the type of the exit process according to some embodiments.

FIG. 9 is a flow diagram of a method 900 for handling an exit process for a VM based on the type of the exit process according to some embodiments. The method 900 may be implemented in some embodiments of the processor 102 shown in FIG. 1. At block 905, processor detects an exit condition generated by the VM executing on the processor. At decision block 910, the processor determines the type of the exit process for the VM. The exit process may be an automatic exit or a non-automatic exit. An automatic exit is an exit condition that does not require that the VM be made aware of the exit and the VM does not instantiate a VM exception handler. Automatic exits may include events that are not expected to modify state information that defines the VM on the processor. Non-automatic exits are exit conditions that require notifying the VM that an exit condition has occurred. The VM exception handler is instantiated in response to non-automatic exit conditions.

If the processor detects an automatic exit condition at decision block 910, the processor saves the state information in protected memory at block 915. For example, an encryption module in the processor may encrypt the state information and store the encrypted state information in a data structure, as discussed herein. At block 920, the processor loads host state information into the processor registers after the state information has been saved to the protected memory. For example, the processor may load state information that defines a hypervisor for the VM. At block 925, the exit process is completed, e.g., by the hypervisor.

If the processor detects a non-automatic exit condition at decision block 910, the processor generates an exception at block 930. The VM instantiates a VM exception handler in response to the non-automatic exit condition and the VM exception handler determines (at block 935) a subset of state information to make visible to other entities such as a hypervisor. The subset may include none, some, or all of the state information that defines the VM on the processor. At block 940, the VM exception handler saves the visible state information to an unprotected memory such as the data structure 122 shown in FIG. 1 or the data structure 212 shown in FIG. 2. In some embodiments, the location of the unprotected memory may be indicated to other entities such as the hypervisor using unencrypted control state information such as the control state information 301 shown in FIG. 3. At block 945, the VM exception handler may generate an automatic exit condition so that the exit process may be completed by saving the state information to the protected memory.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    detecting an exit condition of a virtual machine (VM) executing on a processor that implements registers to define a state of the VM while the processor is executing the VM, wherein the exit condition indicates that the VM is to be removed from execution on the processor and control of the processor is returned to a hypervisor of the VM;
    storing, in response to detecting the exit condition, contents of the registers in a first data structure that is inaccessible to the hypervisor of the VM;
    instantiating, using the VM, an exception handler in response to detecting the exit condition and in response to the exit condition being a non-automatic exit that requires that the VM be made aware of the exit condition, wherein the exception handler is configured to select a subset of the registers; and
    selectively exposing, by the exception handler, contents of the subset of the registers to the hypervisor, and
    issuing, by the exception handler, an exit command to initiate an exit process to remove the VM from execution on the processor in response to exposing contents of the subset of the register to the hypervisor.

2. The method of claim 1, wherein storing the contents of the registers in the first data structure comprises storing the contents of the registers at a memory location that is inaccessible to the hypervisor.

3. The method of claim 1, wherein storing the contents of the registers in the first data structure comprises encrypting the contents of the registers using a hardware encryption module prior to storing the contents of the registers in the first data structure.

4. The method of claim 1, wherein selectively exposing the contents of the subset of the registers comprises storing the contents of the subset of the registers in a second data structure that is visible to the hypervisor.

5. The method of claim 4, further comprising:
    not instantiating the exception handler in response to the exit condition being an automatic exit that does not require that the VM be made aware of the exit condition.

6. The method of claim 5, further comprising:
    completing the exit process for the VM based on the subset of the contents of the registers exposed to the hypervisor in the second data structure.

7. The method of claim 6, wherein completing the exit process for the VM comprises modifying at least one of the subset of the contents of the registers in the second data structure.

8. The method of claim 7, further comprising:
    loading the contents of the registers from the first data structure in response to initiating execution of the VM on the processor after completing the exit process; and
    modifying at least one value in the registers to correspond to the modified at least one of the subset of the contents of the registers in the second data structure.

9. The method of claim 8, wherein loading the contents of the registers from the first data structure comprises loading the contents of the registers from the first data structure in response to a checksum calculated based on the contents of the registers in the first data structure matching a previously stored checksum.

10. An apparatus comprising:
    a processor that implements registers to define a state of a virtual machine (VM) while the VM is running on the processor, wherein the processor detects an exit condition of the VM, wherein the exit condition indicates that the VM is to be removed from execution on the processor and control of the processor is returned to a hypervisor of the VM, wherein the processor is to store, in response to the processor detecting the exit condition, contents of the registers in a first data structure that is inaccessible to a hypervisor of the VM, wherein the VM is to instantiate an exception handler in response to detecting the exit condition and in response to the exit condition being a non-automatic exit that requires that the VM be made aware of the exit condition, wherein the exception handler is to determine a subset of the registers, and wherein the exception handler is to selectively expose contents of the subset of the registers to the hypervisor, and the exception handler is to issue an exit command to initiate an exit process to remove the VM from execution on the processor in response to exposing contents of the subset of the register to the hypervisor.

11. The apparatus of claim 10, wherein the processor is to store the contents of the registers at a location that is inaccessible to the hypervisor.

12. The apparatus of claim 10, further comprising:
a hardware encryption module to encrypt the contents of the registers prior to storing the contents of the registers in the first data structure.

13. The apparatus of claim 10, wherein the VM is to selectively expose the contents of the subset of the registers by storing the contents of the subset of the registers in a second data structure that is visible to the hypervisor.

14. The apparatus of claim 13, wherein the VM does not instantiate the exception handler in response to the exit condition being an automatic exit that does not require that the VM be made aware of the exit condition.

15. The apparatus of claim 14, wherein the hypervisor is to complete the exit process for the VM based on the subset of the contents of the registers exposed to the hypervisor in the second data structure.

16. The apparatus of claim 15, wherein the hypervisor is to modify at least one of the subset of the contents of the registers in the second data structure.

17. The apparatus of claim 16, wherein the hypervisor is to load the contents of the registers from the first data structure in response to initiating execution of the VM on the processor after completing the exit process, and wherein the exception handler is to modify at least one value in the registers to correspond to the modified at least one of the subset of the contents of the registers in the second data structure.

18. The apparatus of claim 17, wherein the hypervisor is to load the contents of the registers from the first data structure in response to a checksum calculated based on the contents of the registers in the first data structure matching a previously stored checksum.

19. A non-transitory computer readable storage medium embodying a set of executable instructions, the set of executable instructions to manipulate a computer system to perform a portion of a process to fabricate at least part of a processing system, the processing system comprising:
a processor that implements registers to define a state of a virtual machine (VM) while the VM is running on the processor, wherein the processor detects an exit condition of the VM, wherein the exit condition indicates that the VM is to be removed from execution on the processor and control of the processor is returned to a hypervisor of the VM, wherein the processor is to store, in response to the processor detecting an exit condition, contents of the registers in a first data structure that is inaccessible to a hypervisor of the VM, wherein the VM is to instantiate an exception handler in response to detecting the exit condition and in response to the exit condition being a non-automatic exit that requires that the VM be made aware of the exit condition, wherein the exception handler is to determine a subset of the registers, and wherein the exception handler is to selectively expose contents of the subset of the registers to the hypervisor, and the exception handler is to issue an exit command to initiate an exit process to remove the VM from execution on the processor in response to exposing contents of the subset of the register to the hypervisor.

20. The non-transitory computer readable storage medium of claim 19, wherein the processing system further comprises:
a hardware encryption module to encrypt the contents of the registers prior to storing the contents of the registers in the first data structure.

* * * * *